May 5, 1953    G. E. WICKMAN ET AL    2,637,030
STAPLING MACHINE WITH GUIDING ELEMENT
Filed June 28, 1951
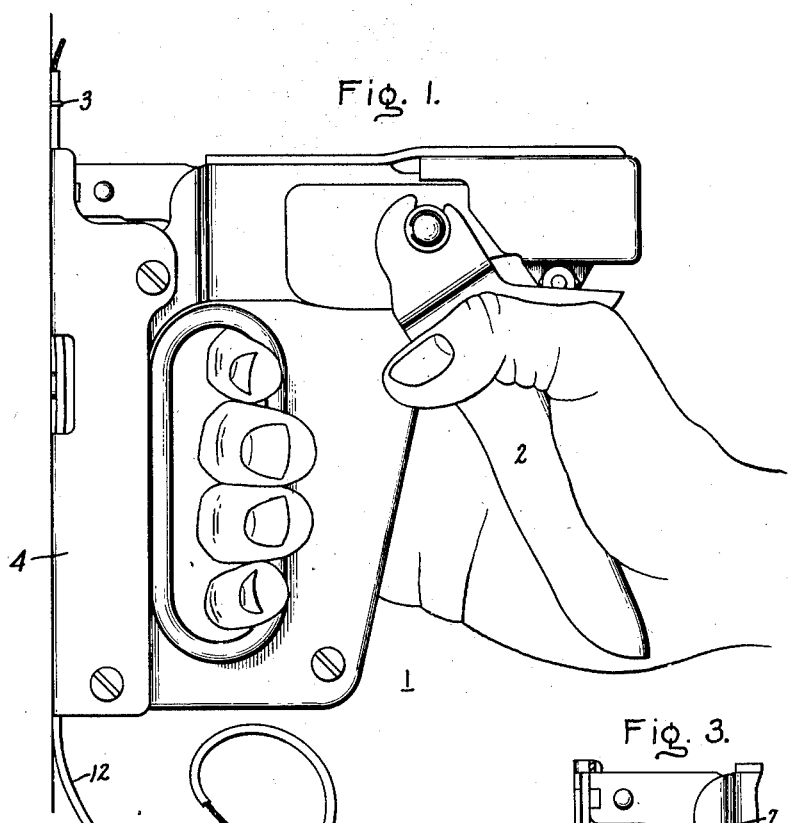
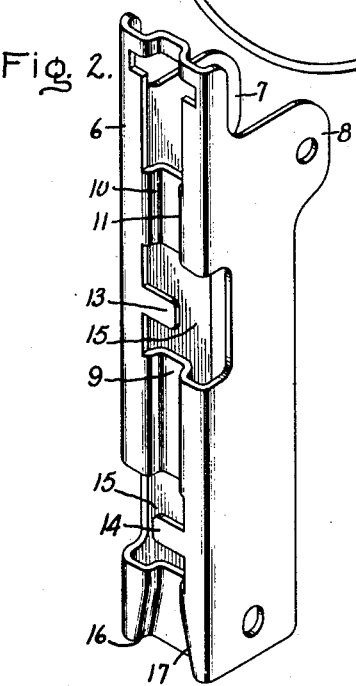
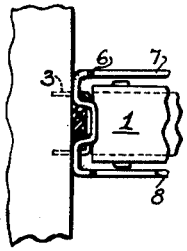
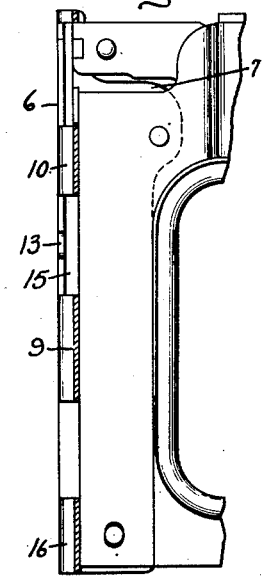
Inventors:
George E. Wickman,
William R. Young,
by
Their Attorney.

Patented May 5, 1953

2,637,030

UNITED STATES PATENT OFFICE 2,637,030

STAPLING MACHINE WITH GUIDING ELEMENT

George E. Wickman, Westport, and William R. Young, Fairfield, Conn., assignors to General Electric Company, a corporation of New York Application June 28, 1951, Serial No. 234,056

3 Claims. (Cl. 1—49)

This invention relates to a stapling machine for securing electric wires to a surface, and more particularly to such a machine provided with a guiding or base element for guiding and positioning an electric wire while it is being secured by stapling to a wall or other surface.

With the increasingly expanded use in homes and buildings of low voltage electric signal circuits such as those for the remote control of electric light and power circuits and the like, a need has arisen for improved means of installation of the electric wires for such circuits. Since such circuits are operated at a low voltage, only small, light-weight, lightly insulated wires need be used and they may be fastened directly to building surfaces of wood or other building materials without the use of enclosing metal conduits or the like.

Electric wires for the foregoing purposes are available today having one or more electrical conductors, usually parallelly disposed, closely spaced side by side, and covered and separated with relatively thin insulation walls such as extruded thermoplastic material, for example, a polyvinyl chloride compound. In its usual form, such thermoplastic insulation is subject to cold flow, especially when under pressure, so that the insulation tends to flow from a region under high pressure to a region under lower pressure. For this reason, a securing element, such as a staple, must not be driven over the wire to such a depth that it will exert great pressure on the outer surface of the thermoplastic insulation, otherwise the insulation may divide away at the staple to eventually produce a short circuit. Other insulations may have similar cold flow characteristics.

Where heretofore much use was made of double pointed tacks for fastening low voltage wires, that procedure is much too slow for present-day use where many feet of wire needs to be installed. An obvious expedient then is to use a stapling machine for the purpose. However, stapling machines commercially available have not been especially well adapted for such use. Not only must such a machine properly limit the depth to which a staple is driven, but also the machine must be relatively light in weight so that it can be used without unduly tiring the operator. Moreover, the machine should be adapted rapidly and accurately to guide and position the wire under slight tension while the staples are being driven and, preferably, only one hand should be required for the operation. Finally, the machine should be readily removable from the wire and attachable to the wire without requiring that an end of the wire be threaded through an opening.

Some stapling machines are commercially available, for example, machines of the type described in U. S. patent to Cavanaugh No. 2,137,642, issued November 22, 1938, which provide a suitable staple driving mechanism and which are suitably light in weight and permit convenient and rapid operation. Such machines, however, as indicated above, do not in themselves provide the other desirable features which a stapling machine for electric wires should provide.

It is an object of this invention, therefore, to provide a stapling machine particularly adapted for securing electric wires to a surface.

Further objects of this invention are to provide in a stapling machine a guiding and positioning element for electric wires which are to be stapled to a surface; to provide such an element which permits the attachment and removal of the machine from the wire at any convenient position along the wire; and to provide such an element which properly spaces the machine's staple driving element in its lowest position from the surface into which the staple is being driven to avoid excessive pressure on the stapled wire.

Further objects and advantages of this invention will become apparent and the invention will be more clearly understood from the following description, referring to the accompanying drawing and the features of novelty which characterize this invention will be pointed out with particularity in the claims annexed to and forming a part of this specification.

Briefly, this invention comprises in a stapling machine for electric wires a base element for guiding and positioning a wire to be stapled and for spacing the stapling mechanism of the machine away from the stapling surface thereby limiting the depth of penetration of the staples. The base element is arranged to facilitate the attachment and separation of the stapling machine and the wire being stapled.

Referring to the drawing, Fig. 1 is a front view of a stapling machine and the wire guiding base element therefor; Fig. 2 is a perspective view of the wire guiding base element for a stapling gun; Fig. 3 is a front cut-away view of the base element; and Fig. 4 is an end view showing the relative positions of a stapled wire and the base element.

Referring to the drawing, a stapling machine 1 is shown as being of any conventional type, such, for example, as the one shown in U. S. Patent 2,137,642. By stapling machine is meant a machine which holds a plurality of U-shaped staples that are automatically fed into a driving position and which are driven from this driving position by means of a spring operated hammer. The staples leave the machine with such a velocity that they are driven into a wall or other surface against which the stapling machine is placed. The stapling machine, in a conventional form, is hand operated by a trigger 2 that spring loads and releases a hammer for the driving of an individual staple 3.

To accomplish the objects set forth above, a wire guiding and positioning base element 4 is shown having a substantially U-shaped cross-section including a base portion 6 which connects a pair of parallel legs or sides 7 and 8. The base 6, in turn, is bent in such a manner that a channel 9 is formed centrally therein. Channel 9 is also a U-shaped section having a pair of substantially parallel legs or sides 10 and 11. It is to be noted that channel 9 is not continuous, but that it is interrupted to provide a structure that gives the effect of a continuous channel while allowing for certain gaps, the purpose of which will be hereinafter described.

Our new base element 4 is suitably secured to the machine. While the machines of the type illustrated in Patent No. 2,137,642 provide for the positioning of the staple driving elements directly adjacent to the surface into which the staples are to be driven so that the staples are driven to their full depth, the new base element holds the machine away from the stapling surface by a distance dependent upon the depth of channel 9, thereby to insure the driving of a staple to a depth that secures the wire while not cutting the insulation.

The depth of channel 9 is not critical and, consequently, it is not to be considered a limitation on the scope of this invention. The depth is determined from the inter-relation between the thickness of the insulated wire 12 and the physical properties of the stapling machine mechanism.

It has been mentioned that one of the desired features of a wire stapling machine is that its construction should facilitate the positioning of the machine on the wire or the removal therefrom without the necessity of threading a long piece of wire through a completely enclosed channel. This object is met by employing a pair of ears 13 and 14, each of which extends from opposite sides of the channel 9 a distance greater than half the width of the channel to define a channel section which, in end view, resembles a completely enclosed rectangle. Portions of the base element 4 adjacent the free ends of ears 13, 14 are cut away, providing spaces 15 to allow for the slipping of the wire 12 over the ears 13 and 14. With this structure, the wire may be held against the channel 9 and deflected over the ear 13 by bending the wire 12 into one of the spaces 15. Wire 12 is then brought again into the channel 9 and threaded over the next ear 14 by deflecting the wire into the adjoining spaced 15. Thus, the wire is held in position in channel 9 by the ears 13, 14 while the machine is slid along the wire to the successive stapling positions. If the machine is tilted slightly to lift one end of the base element from the stapling surface, a mild tension is applied to the wire by the friction produced by the base element and, consequently, the wire is held straight and only one hand is required for the stapling process.

It is to be noted that the tail end of channel 9 is flared outwardly to provide two deflecting legs 16 and 17 which guide the movement of the wire through the machine while avoiding the possibility of the legs 10, 11 of the channel cutting through the insulation.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What we claim as new and desire to secure by Letters Patent of the United States is:

1. In a stapling machine for fastening wire to a surface, a wire positioning and guiding base element comprising an elongated member having plane base surfaces with recesses therein whose walls are cut away at intervals but which together define a discontinuous, elongated channel adapted to receive a wire to be stapled, and spaced ears alternately extending into and partially across said channel from opposite sides at the cutaway intervals, whereby the wire to be stapled can be laterally inserted into the channel and removed therefrom and will be held in the channel by said ears during relative longitudinal motion between said base element and the wire.

2. In a stapling machine for fastening wire to a surface, a wire positioning and guiding base element comprising an elongated, formed, sheet member having a U-shaped in cross-section, the bottom portion of the U having a pair of elongated base surface portions adapted to be positioned against the stapling surface, and said bottom portion of the U further having between said surface portions an elongated, inverted U-shaped channel therein adapted to receive a wire to be stapled, said member having an opening in a side wall and in said channel and an ear extending from the opposite side into said opening for retaining a wire in the channel.

3. A stapling machine for stapling electric wire to a stapling surface comprising in combination a staple driving mechanism and a wire positioning and guiding base element secured to said mechanism, said base element having base surfaces adapted to be positioned against the stapling surface and having means for supporting the staple driving mechanism a predetermined distance away from the stapling surface, said base element further having elongated, aligned recesses in said base surfaces, the walls of said recesses together defining a discontinuous elongated channel adapted to receive a wire to be stapled, and a plurality of ears extending from said base surfaces into said channel and partially across the same at intervals alternately in opposite directions for holding a wire in said channel during relative longitudinal motion between said base element and the wire.

GEORGE E. WICKMAN.
WILLIAM R. YOUNG.

References Cited in the file of this patent

UNITED STATES PATENTS

| Number | Name | Date |
|---|---|---|
| 1,655,275 | La Place | Jan. 3, 1928 |
| 2,285,512 | Harley | June 9, 1942 |

FOREIGN PATENTS

| Number | Country | Date |
|---|---|---|
| 89,879 | Swedish | May 15, 1935 |
| 95,078 | Swedish | Apr. 14, 1937 |